(12) United States Patent
Aleman

(10) Patent No.: US 8,091,196 B2
(45) Date of Patent: Jan. 10, 2012

(54) DEVICE FOR MOUNTING A PART TO THE BODY OF A MOTOR VEHICLE

(75) Inventor: Alain Aleman, Trappes (FR)

(73) Assignee: Renault s.a.s., Boulogne Billancourt (FR)

( * ) Notice: Subject to any disclaimer, the term of this patent is extended or adjusted under 35 U.S.C. 154(b) by 825 days.

(21) Appl. No.: 11/914,830

(22) PCT Filed: Apr. 20, 2006

(86) PCT No.: PCT/FR2006/050361
§ 371 (c)(1),
(2), (4) Date: Jul. 1, 2008

(87) PCT Pub. No.: WO2006/123077
PCT Pub. Date: Nov. 23, 2006

(65) Prior Publication Data
US 2008/0265620 A1 Oct. 30, 2008

(30) Foreign Application Priority Data

May 18, 2005 (FR) ..................................... 05 51285

(51) Int. Cl.
*B25B 27/00* (2006.01)
(52) U.S. Cl. ............................ 29/270; 29/897.2; 269/47
(58) Field of Classification Search .................... 29/700, 29/259, 260, 270, 244, 897.2; 269/905, 48.2, 269/48.3, 47; 114/201; 49/42, 122, 324
See application file for complete search history.

(56) References Cited

U.S. PATENT DOCUMENTS

| 1,140,524 | A | * | 5/1915 | Mosier et al. | ............... 109/59 R |
| 2,271,952 | A | * | 2/1942 | Raus | .............................. 114/117 |
| 2,355,025 | A | * | 8/1944 | Arthur | ............................ 292/45 |
| 2,460,961 | A | * | 2/1949 | Wilson | ............................ 292/48 |
| 5,040,290 | A | * | 8/1991 | Usui et al. | ........................ 29/787 |
| 5,181,307 | A | * | 1/1993 | Kitahama et al. | ............... 29/434 |
| 6,643,905 | B2 | * | 11/2003 | Rhoads et al. | ............. 29/407.09 |
| 6,895,647 | B2 | * | 5/2005 | Matsumoto et al. | ......... 29/281.4 |
| 2006/0145528 | A1 | * | 7/2006 | Dangleman | .............. 301/37.101 |

FOREIGN PATENT DOCUMENTS

FR 2 786 154 5/2000

OTHER PUBLICATIONS

U.S. Appl. No. 11/914,823, filed Nov. 19, 2007, Aleman.

* cited by examiner

*Primary Examiner* — David Bryant
*Assistant Examiner* — Christopher Koehler
(74) *Attorney, Agent, or Firm* — Oblon, Spivak, McClelland, Maier & Neustadt, L.L.P.

(57) ABSTRACT

A device for mounting a part to a body of a motor vehicle. A positioning mechanism positions the part in relation to the body in a determined fixing position, which is geometrically defined in a reference trihedral formed by the longitudinal axis X, the transverse axis Y, and the vertical axis Z of the body. The positioning mechanism includes a temporary mounting structure including a first mechanism mounting the structure to the body in a given use position in which a second mechanism belonging to the structure cooperates with the part to position the part in relation to the body in the above-mentioned determined fixing position, which is defined by a given positioning reference system corresponding to the use position of the structure on the body.

14 Claims, 2 Drawing Sheets

DEVICE FOR MOUNTING A PART TO THE BODY OF A MOTOR VEHICLE

BACKGROUND

The invention relates to a device for mounting a part on the body of a motor vehicle.

The invention relates more particularly to a device for mounting a part, such as a support for mounting a bodywork element, on the body of a motor vehicle, of the type comprising means for positioning the part relative to the body in a determined position, called the fastening position, that is defined geometrically in a reference trihedron (X, Y, Z) formed by the longitudinal axis X, the transverse axis Y and the vertical axis Z of the body, so as to proceed in particular to fasten the part, thus positioned, on the body of the vehicle.

Many devices of this type are known that are used at the stations of an assembly line designed for the manufacture of the vehicle in order to carry out there the mounting of various parts on the body of a vehicle, such as supports, bodywork elements or opening elements.

To do this, automated devices are usually used comprising in particular very complex tools such as robotic arms that are mounted so as to be movable in order to carry out assemblies "on the move", that is to say that are capable of moving along the assembly line at the same time as the body.

Such mounting devices are for example capable of picking up a part thanks to gripping means of the sucker type from a storage station and of positioning this part relative to the body in a determined geometric position that is defined relative to the body in order to fasten the part to the body.

Specifically, in the case of mounting a part, such as a bodywork element support, it is first positioned relative to the body and then it is fastened to the body by means of appropriate conventional fastening means.

In the case of a supporting part for a bodywork element, it is imperative to control with precision and repetitively the correct positioning of the part to be fastened to the body since that also determines the positioning of the bodywork element that will be mounted later.

Therefore, precision in the positioning of the supporting part during mounting and in fastening makes it possible to ensure that a good quality of assembly of the elements is obtained, in particular their positioning flush with one another in the case of a bodywork element such as a side wing or else an engine hood.

The mounting devices according to the prior art require many controls, often complex to study and design, that require considerable perfection time on the assembly line.

In addition, although having autonomous operation, such devices require regular maintenance operations that then cause stoppages of the station, and even of the assembly line, which are damaging in terms of productivity and are therefore particularly costly.

In addition, each device is usually, from its conception, dedicated to mounting a particular part at a given station on a determined assembly line so the devices can be readapted little or not at all to new stations of new lines designed in particular for the production of a new vehicle.

Consequently, the devices comprising positioning means that are known in the prior art are not fully satisfactory.

BRIEF SUMMARY

The object of the invention is to propose a device for mounting a part on the body comprising positioning means that are particularly economical, reliable, flexible to use and easy to apply.

For this purpose, the invention proposes a device for mounting a part on the body of a motor vehicle of the type described above, characterized in that the positioning means comprise a provisional mounting structure comprising first means for mounting the structure on the body in a given position of use in which second means of the structure interact with the part in order to position it relative to the body in said determined fastening position which is defined according to a given positioning reference system (X', Y', Z') corresponding to the position of use of the structure on the body.

Thanks to the invention, the positioning means are capable of being easily and rapidly applied, in particular during the beginning of production of a new vehicle, and guarantee a mounting quality and reliability irrespective of the types of parts, particularly the supports of front side wings or the hinges of the engine hood.

According to other features of the invention:
the first means comprise temporary means for coupling the structure to the body so as to position the structure relative to the body according to at least a first of the three axes of the positioning reference system (X', Y', Z') such as the vertical axis Z', which determines the position of fastening of the part relative to the reference trihedron (X, Y, Z) of the body;
the coupling means consist of pins that are received in matching holes of the body;
at least one of the coupling pins comprises means for transverse abutment of the structure relative to the body;
the first means comprise locking means for immobilizing the structure on the body according to at least a last X' and/or Y' of the three axes of said positioning reference system (X', Y', Z');
the locking means comprise first means for locking the structure in the position of use on the body that are mounted so as to be able to rotate between:
a rest position in which the means are positioned so as not to interfere with the body when the structure is mounted on the body, and
a locked position in which the means are positioned so as to immobilize the structure relative to the body along the transverse axis Y';
the locking means comprise second means for locking the structure in the position of use on the body that are mounted so as to be able to move in translation between:
a rest position in which the second means enter, with clearance, matching orifices of the body, and
a locked position in which the second means interact with the body so as to immobilize the structure relative to the body along the longitudinal axis X';
the second means of the structure comprise centering means so as to position the part relative to the body in the determined fastening position;
the part thus positioned is fastened to the body by means of fastening means;
the structure is made of light and strong material, such as carbon fiber.

BRIEF DESCRIPTION OF THE DRAWINGS

Other features and advantages of the invention will appear on reading the following detailed description for the understanding of which reference will be made to the appended figures amongst which.

DETAILED DESCRIPTION

In the description and the claims, expressions such as "rear" and "front", "left" and "right", or "top" and "bottom" and the orientations "longitudinal", "transverse" and "vertical" will be used in a nonlimiting manner with reference to the trihedron (X, Y, Z) represented in the figures and to the definitions given in the description.

In addition, identical, similar or analogous elements of the invention will be indicated by the same reference numbers.

Figure 1:
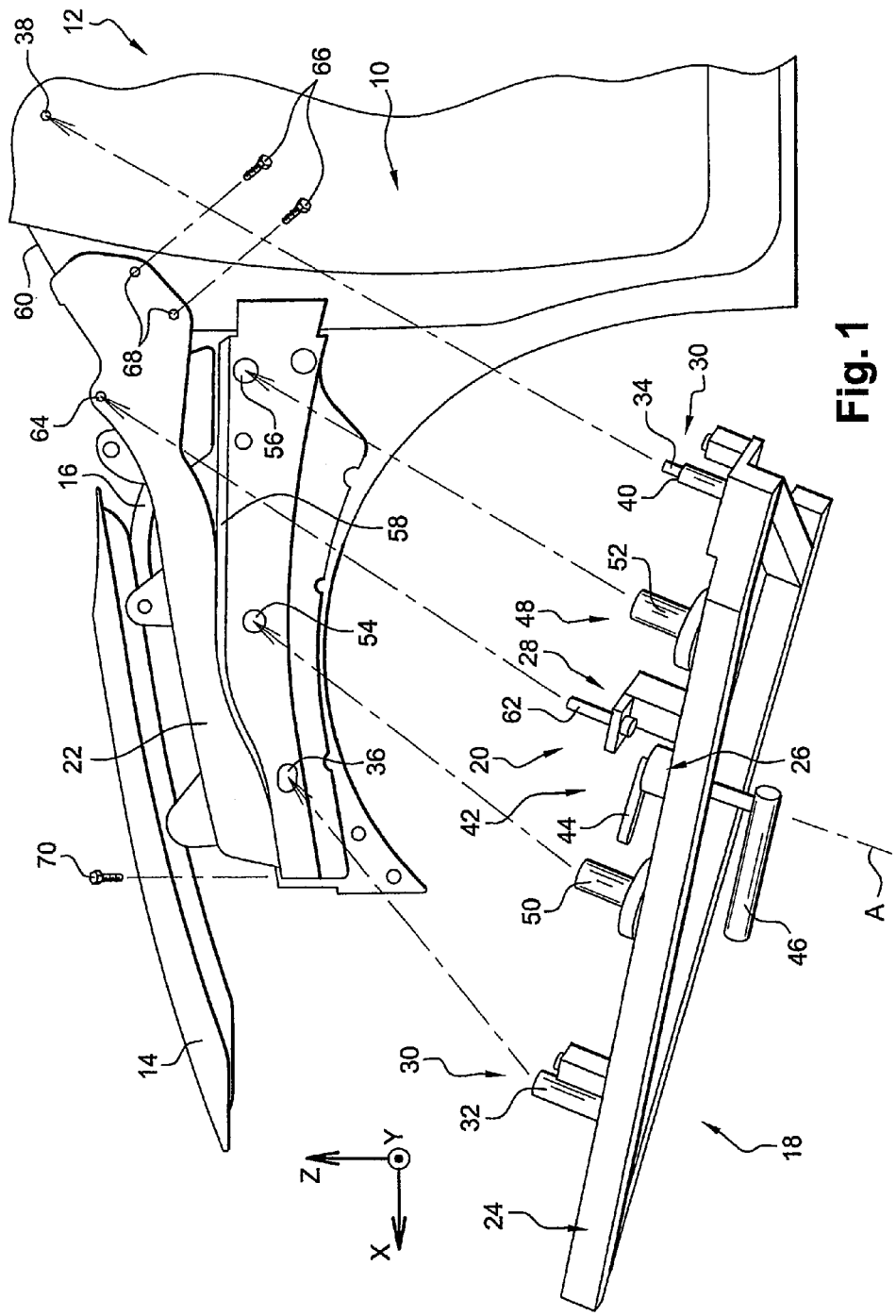
FIG. 1 is a schematic side view that represents, as an exploded view before assembly, the provisional mounting structure according to the invention that is designed to position the part consisting of the wing support mounted on the body of the vehicle.

Partially represented in FIG. 1, in side view, is a body 10 of a motor vehicle 12 during manufacture on an assembly line (not shown), that is to say essentially the front longitudinal portion of the body 10.

Various parts are mounted on the front portion of the body 10, particularly the engine hood 14 that is mounted on the body by means of two hinges 16, side wings or else the front face of the vehicle 12.

In a known manner, the hood 14 is mounted so as to be movable between a closed operating position in which it extends generally horizontally as illustrated in FIG. 1 and an open position in which it allows access to the engine.

As a nonlimiting example, the following description will describe the use of a device 18 comprising positioning means 20 according to the invention for mounting a part forming a support for mounting a bodywork element (not shown), more precisely here a support 22 designed to allow the mounting and/or fastening of the left side wing (not shown) of the bodywork of the vehicle 12.

The device 18 for mounting the support 22 on the body 10 of the motor vehicle 12 is of the type comprising means 20 for positioning the support 22 relative to the body 10 in a determined position, called the fastening position, which is defined geometrically in a reference trihedron (X, Y, Z) formed by the longitudinal axis X, the transverse axis Y and the vertical axis Z of the body 10.

The positioning means 20 therefore make it possible in particular to position the support 22 relative to the body 10 in order to fasten the support 22, thus correctly positioned, to the body 10.

According to the invention, the positioning means 20 comprise a provisional mounting structure 24 comprising first means 26 for mounting the structure 24 on the body 10 in a given position of use in which second means 28 of the structure 24 interact with the support 22 in order to position it relative to the body 10 in said determined fastening position which is defined according to a given positioning reference system (X', Y', Z').

The first means 26 comprise temporary means 30 for coupling the structure 24 to the body 10 so as to position the structure 24 relative to the body 10 according to at least a first of the three axes of the positioning reference system (X', Y', Z'), here the vertical axis Z', which determines the fastening position of the support 22 relative to the reference trihedron (X, Y, Z) of the body 10.

As a variant, the means 30 for coupling the structure 24 to the body 10 position the structure 24 along the longitudinal axis X' and the vertical axis Z' corresponding to its position of use.

Preferably, the coupling means 30 consist of pins, here a front pin 32 and a rear pin 34, which extend from the structure 24 transversely to the right, that is to say to the body 10 which comprises matching holes in which the pins 32, 34 are received.

In the mounted position, the front pin 32 and the rear pin 34 thus enter respectively a front hole 36 and a rear hole 38 in the body 10.

Advantageously, at least one pin 34 of the coupling pins 32, 34 comprises means, such as an annular collar 40, forming a transverse abutment of the structure 24 relative to the body 10.

The first means 26 comprise locking means 42 capable of immobilizing the structure 24 on the body 10 along at least a last axis X' of the three axes of said positioning reference system (X', Y', X'), advantageously along the longitudinal axis X' and the transverse axis Y'.

More precisely, the locking means 42 comprise first locking means, such as a locking finger 44, for locking the structure 24 in the position of use on the body 10 along the transverse axis Y'.

The locking finger 44 is arranged substantially in the center of the structure 24 and it is mounted so as to be movable between:
  a rest position in which the finger 44 extends generally longitudinally so as not to interfere with the body 10 when the structure 24 is mounted on the body, and
  a locked position in which the finger 44 extends generally vertically so as to press against the inner vertical face of the body 10 to immobilize the structure 24 relative to the body 10 along the transverse axis Y'.

Advantageously, the locking finger 44 is mounted so as to be able to rotate about a substantially transverse axis A and it is operated between its extreme rest and locked positions by means of an operating means, here a handle 46 that is able to be actuated manually by an operator.

The locking means 42 also comprise second means 48 for locking the structure 24 in the position of use on the body 10, such as locking spigots.

Preferably, the structure 24 comprises a front locking spigot 50 and a rear locking spigot 52 that are received, in the mounted position, in matching orifices respectively 54 and 56 in the body 10.

The locking spigots 50, 52 are mounted so as to be movable and are operated in movement by means of the handle 46, that is advantageously at the same time as the transverse locking finger 44 of the structure 24.

The locking spigots 50, 52 are mounted so as to be movable in translation in the longitudinal direction between:
  a rest position in which each spigot 50, 52 enters, with clearance, a matching orifice 54, 56 of the body 10, and
  a locked position in which each spigot 50, 52 interacts with a portion of the edge 58 delimiting the orifice 54, 56 of the body 10 so as to immobilize the structure 24 relative to the body 10 along the longitudinal axis X'.

The support 22 is illustrated here directly mounted on the body 10 relative to which it will then be positioned in its determined fastening position by means of the device 18 when the latter is mounted on the body 10 and positioned in its position of use.

As can be seen in FIG. 1, the support 22 is mounted pressing against a top longitudinal edge 58 of the body 10 and against an upright edge 60.

As a variant, the support 22 is first mounted on the device 18 and the subassembly thus formed is then mounted on the body 10.

The position of use of the structure 24 on the body 10 therefore corresponds here to the position obtained according to the reference trihedron (X, Y, Z) after actuation of the locking means to immobilize the structure 24 and the support 22 relative to the body 10.

Advantageously, the second means 28 of the structure 24 comprise centering means, such as a locator 62, that is received in a matching hole 64 of the support 22 so as to position the support 22 relative to the body 10 along the axes X, Y, Z in the determined fastening position.

The successive operating operations of the mounting structure 24 of the device 18 will now be described in greater detail.

As can be seen in FIG. 1, the support 22 having first been mounted on the body 10, the structure 24 is then mounted on the body 10.

To do this, the structure 24 is mounted in a transverse movement in the direction of the body 10, along the dot-and-dash lines shown in FIG. 1, so as to insert respectively the front pin 32 and rear pin 34 in the front hole 36 and rear hole 38, and the front locking spigot 50 and rear locking spigot 52 in the matching orifices 54 and 56.

In addition, the locator 62 of the structure 24 is inserted into the matching hole 64 of the support 22 so that the support 22 is then linked in movement to the structure 24.

Figure 2:
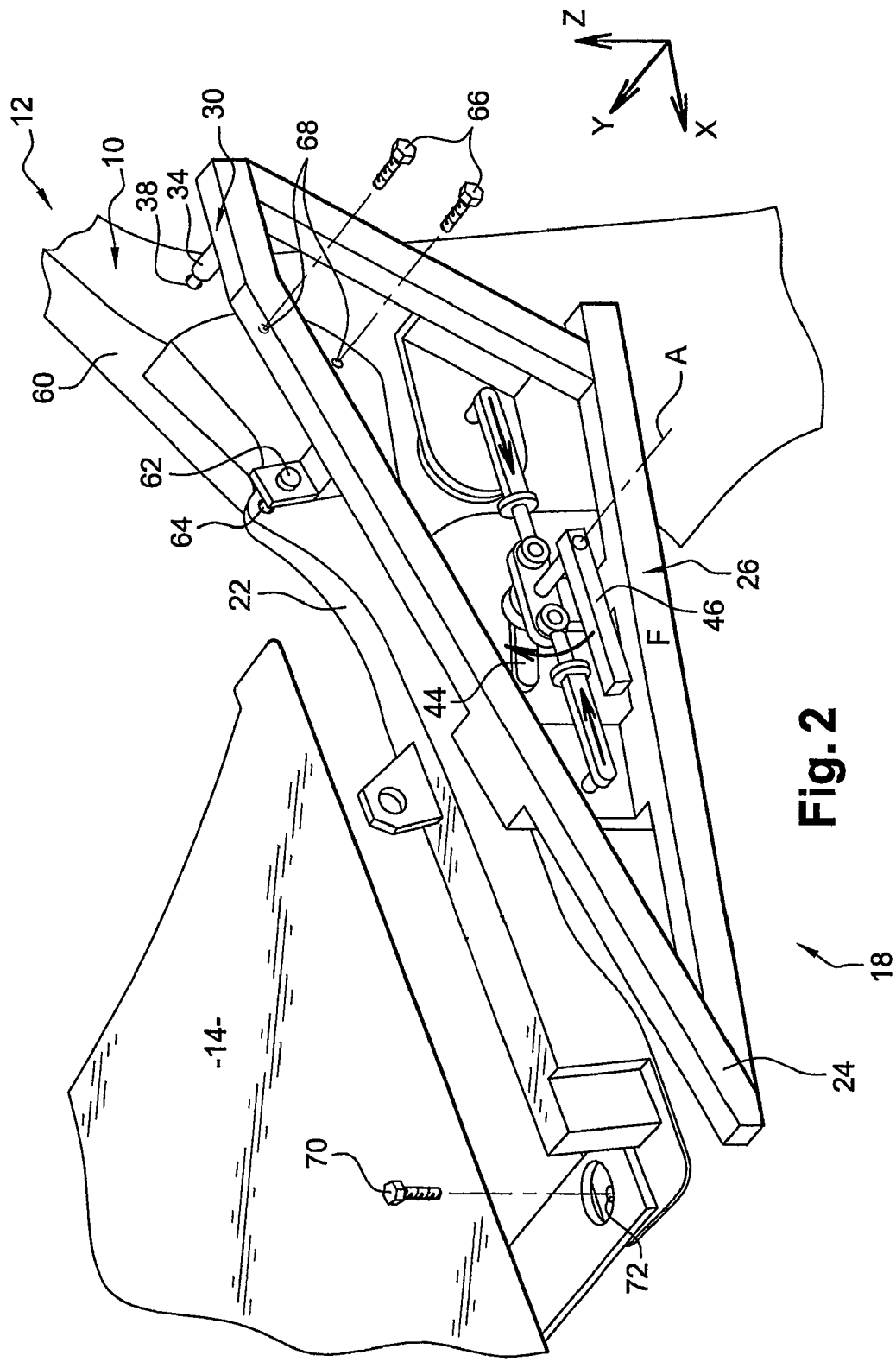
FIG. 2 is a schematic view that represents the mounting structure of FIG. 1 mounted in the position of use on the body.

After it has been mounted, the structure 24 is in the position illustrated in FIG. 2.

As explained above, the structure 24 is not yet positioned in the position of use that is reached only after the actuation of the locking means 42 to immobilize the structure 24.

Specifically, before it is immobilized, the structure 24, although mounted onto the body 10, is capable of moving along at least one or two axes X' and Y' of the given positioning reference system (X', Y', Z').

The structure 24 being in the mounted position illustrated in FIG. 2, the handle 46 is then actuated to operate the movement of the locking finger 44 and of the locking spigots 50 and 52 from their rest position to their locked position.

The handle 46 is for example rotated a quarter-turn in the direction of the arrow F which simultaneously causes, on the one hand, the rotational movement of the locking finger 44 which presses against the inner vertical face of the body 10 and, on the other hand, the movement in translation of each of the locking spigots 50, 52 in the direction of the transverse axis A.

The locking finger 44 positions the structure 24 in its position of use along the transverse axis Y', the annular abutment collar 40 advantageously pressing against the facing surface of the body 10 that is adjacent to the hole 38.

The locking spigots 50 and 52 move in opposite directions toward one another until each of the spigots interacts with a portion of the edge of the hole 54, 56 to position the structure 24 along the axis X'.

The structure 24 is consequently immobilized in its position of use and the support 22 is automatically in its determined fastening position.

Consequently, the support 22 thus correctly positioned is able to be fixedly fastened to the body 10 by means of fastening means, such as screws.

The fastening means comprise for example two first screws 66 that are received transversely in matching holes 68 of the support 22 and of the body 10, and a second screw 70 that is received vertically in a matching hole 72.

The second screw 70 is arranged at the longitudinal front end of the support 22 while the first screws 66 are situated on the rear longitudinal portion.

The support 22 being fastened to the body 10 and being correctly positioned, the handle 46 is operated in the opposite direction to move the locking means 42 into the rest position and remove the structure 24 which may then be used to repeat the operation of mounting a support 22 on the next vehicle 12.

Advantageously, the provisional mounting structure 24 is made of a strong and light material, such as carbon fiber or similar material, so as to be easily handled by an operator while allowing compliance with assembly rates.

The device 18 for mounting the part 22 according to the invention is therefore particularly flexible to use particularly in that it does not require any long and costly perfecting.

Consequently, the provisional mounting structure 24 allows an extremely appreciable time-saving, in particular when starting a new assembly line and requires no maintenance operation.

Advantageously, the mounting structure is able to be used by an operator in a manner totally independent of the other stations on the assembly line.

Naturally, the mounting of the wing support 22 is only one nonlimiting example of a part able to be positioned thanks to the structure 24 according to the invention.

The invention claimed is:

1. A device for mounting a part on a body of a motor vehicle, comprising:
   means for positioning the part relative to the body in a determined fastening position, that is defined geometrically in a reference trihedron formed by a longitudinal axis, a transverse axis, and a vertical axis of the body, to fasten the part thus positioned to the body of the vehicle,
   wherein the means for positioning includes a provisional mounting structure including first means for mounting the structure on the body in a given position of use in which second means of the structure interact with the part to position the part relative to the body in the determined fastening position, which is defined according to a given positioning reference system corresponding to the position of use of the structure on the body, and
   wherein the first means for mounting includes a locking finger to immobilize the structure on the body along the transverse axis, at least one spigot to immobilize the structure on the body along the longitudinal axis, and a handle to rotate the locking finger around the transverse axis and move the at least one spigot in translation along the longitudinal axis.

2. The device as claimed in claim 1, wherein the first means comprises temporary means for coupling the structure to the body so as to position the structure relative to the body according to at least a first of the axes of the positioning reference system, which determines the fastening position of the part relative to the reference trihedron of the body.

3. The device as claimed in claim 2, wherein the means for coupling includes pins that are received in matching holes of the body.

4. The device as claimed in claim 3, wherein at least one of the pins of the means for coupling comprises means for transverse abutment of the structure relative to the body.

5. The device as claimed in claim 1, wherein the locking finger is mounted to be rotated by the handle between:
   a rest position in which the locking finger is positioned so as not to interfere with the body when the structure is mounted on the body, and
   a locked position in which the locking finger is positioned so as to immobilize the structure relative to the body along the transverse axis.

6. The device as claimed in claim 5, wherein the at least one spigot is mounted to be moved by the handle in translation between:
   a rest position in which the at least one spigot enters, with clearance, matching orifices of the body, and a locked position in which the at least one spigot interacts with the body so as to immobilize the structure relative to the body along the longitudinal axis.

7. The device as claimed in claim 1, wherein the at least one spigot is mounted to be moved by the handle in translation between:
- a rest position in which the at least one spigot enters, with clearance, matching orifices of the body, and
- a locked position in which the at least one spigot interacts with the body so as to immobilize the structure relative to the body along the longitudinal axis.

8. The device as claimed in claim 1, wherein the second means of the structure comprises centering means to position the part relative to the body in the determined fastening position.

9. The device as claimed in claim 1, wherein the part thus positioned is fastened to the body by fastening means.

10. The device as claimed in claim 1, wherein the structure is made of a light and strong material.

11. The device as claimed in claim 1, wherein the structure is made of carbon fiber.

12. A device for mounting a part on a body of a motor vehicle, comprising:
- a provisional mounting structure to position the part relative to the body in a determined fastening position, that is defined geometrically in a reference trihedron formed by a longitudinal axis, a transverse axis, and a vertical axis of the body, the structure including
  - a locking finger to immobilize the structure on the body along the transverse axis,
  - at least one spigot to immobilize the structure on the body along the longitudinal axis, and
  - a handle to rotate the locking finger around the transverse axis and move the at least one spigot in translation along the longitudinal axis.

13. The device as claimed in claim 12, wherein the structure includes pins extending along the longitudinal axis to be received in matching holes of the body.

14. The device as claimed in claim 13, wherein at least one of the pins includes an annual collar to form a transverse abutment of the structure relative to the body.

* * * * *